July 18, 1961  I. L. JOY  2,992,553
COUPLING METHOD AND APPARATUS FOR ULTRASONIC
TESTING OF SOLID BODIES
Filed April 24, 1957  3 Sheets-Sheet 1

INVENTOR.
Ivan L. Joy
BY
Mann, Brown & McWilliams
Attys.

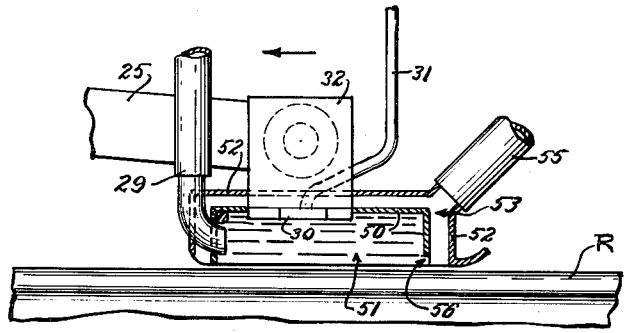
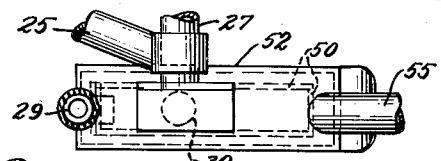
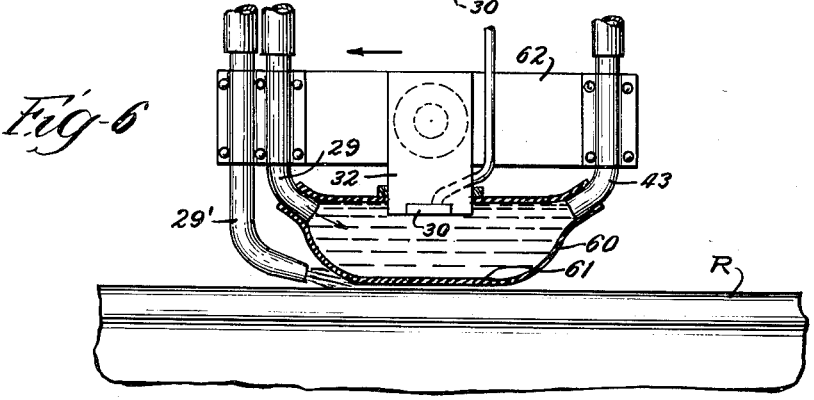
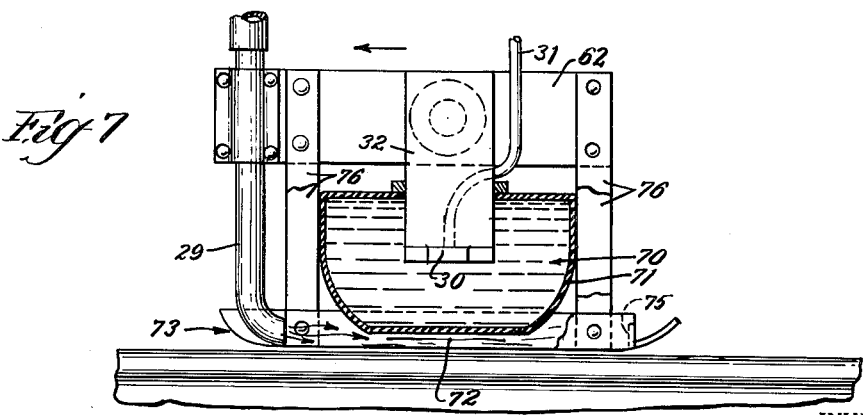

July 18, 1961            I. L. JOY            2,992,553
COUPLING METHOD AND APPARATUS FOR ULTRASONIC
TESTING OF SOLID BODIES
Filed April 24, 1957            3 Sheets-Sheet 3
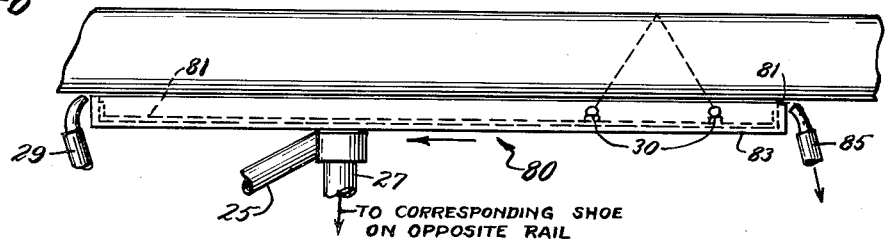
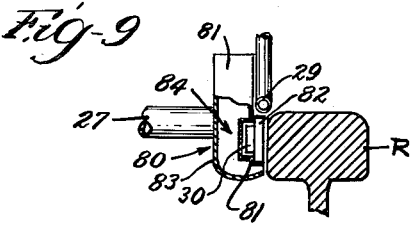
INVENTOR.
Ivan L. Joy
BY Mann, Brown & McWilliams
Attys.

United States Patent Office 2,992,553
Patented July 18, 1961

2,992,553
COUPLING METHOD AND APPARATUS FOR ULTRASONIC TESTING OF SOLID BODIES
Ivan L. Joy, 1616 W. Dudley Road, Topeka, Kans.
Filed Apr. 24, 1957, Ser. No. 654,941
13 Claims. (Cl. 73—67.8)

This invention relates to a method and apparatus for maintaining a coupling liquid between the spaced-apart facing surfaces of a body under test and an emitter of ultrasonic elastic wave energy and finds particular application in the continuous progressive ultrasonic inspection of track rail.

The prior art is replete with ultrasonic coupling arrangements for the stationary testing of objects, but none of these may practicably be employed in the continuous progressive testing of rail. Similarly a number of coupling arrangements for continuous progressive testing with ultrasonics are known; but they, too, are subject to one or more of the exacting practical difficulties that experience indicates are inherent in the continuous progressive testing of rail. These difficulties must be overcome in order to realize an effective ultrasonic rail testing system.

Some of the more important problems are pointed up briefly in order to provide a firm appreciation of the importance of the advances represented by the present invention.

The rail surface or surfaces through which the ultrasonic energy must pass not infrequently are rough, or even rusty, and of varying contour; hence, to avoid damage to the piezoelectric crystal that is usually employed as the emitter of the ultrasound, and to allow for necessary crystal-movement, the crystal and rail surface must be appropriately spaced apart. The provision of an adequate liquid path between the facing surfaces of the emitter and the rail which are undergoing continuous relative movement is a difficult task.

One approach is the use of a confined static column of liquid that is progressed with the crystal, but, due to heat and turbulence, the liquids used in prior art arrangements of this nature have a pronounced tendency to release gas bubbles which interfere with the transmission of the ultrasound. Also, rough and ragged rail portions trap air bubbles which are carried into contact with and released into the coupling liquid. This effect is aggravated in the instances where the arrangement is such that the gas bubbles are permitted to collect on the face of the crystal. In the continuous progressive testing of rail, the emitter and associated confining chamber for the coupling liquid may reach temperatures on the order of 150° F.; and this, of course, results in a severe gas bubble problem. Additionally, vibration and shock effects which are practically unavoidable in this type of rail testing, agitate the coupling liquid and also cause gas bubbles.

Another approach is to flow a stream of coupling liquid between the facing surfaces of the emitter and the rail. Any turbulence of the flow stream, however, impairs its coupling effectiveness and induces the generation and release of gas bubbles. In rail testing, the ragged and rusty condition of the rail surfaces, in combination with the movement of the car along the rail, has a disturbing influence on the flow stream of the coupling liquid. Furthermore, the present-day difficulties of storing and transporting large quantities of coupling liquid on a detector car make it imperative to reclaim and recirculate the coupling liquid; but in this process, many additional gas bubbles and impurities are introduced; and the liquid must be cleaned quickly and efficiently before it can be reused.

In locations where the rail surfaces are very rough and uneven, it is extremely difficult to confine the coupling liquid in a pool on the rail; but the development of an adequate pooling of the coupling liquid is vital if an effective reclaiming system is to be achieved.

It is the principal object of the present invention to provide coupling methods and arrangements that overcome the above-noted difficulties and that permit a more effective and reliable ultrasonic system for the continuous progressive testing of rail.

The principles of the invention are embodied in a variety of physical forms, some of which utilize a confined quantity of coupling liquid, and others of which employ a stream-like flow of coupling liquid moving transverse to the direction in which the crystal and test surface are spaced apart to simultaneously sweep both the face of the emitter and the rail surface. Preferably, the flow is directed oppositely to the direction of movement of the emitter along the rail.

Other objects and advantages of the invention will become apparent during the course of the following description.

In the acompanying drawings forming a part of this specification and in which like numerals are employed to designate like parts throughout the same:

FIG. 4 is a side sectional view illustrating the coupling apparatus of FIG. 2 with a liquid reclaiming hood applied;

FIG. 5 is a top plan view of the arrangement of FIG. 4;

FIG. 6 is a side sectional view of another form of coupling apparatus that is characterized by the use of two (2) separate coupling liquid supply circuits;

FIG. 7 is a side sectional view of still another form of coupling apparatus utilizing a permanently stored quantity of coupling liquid that is progressed along the rail in the form of a static column;

FIG. 8 is a top plan view of an ultrasonic coupling apparatus applied to side rail testing; and FIG. 9 is a developed sectional view through the principal parts of the coupling apparatus of FIG. 8.

Figure 1:
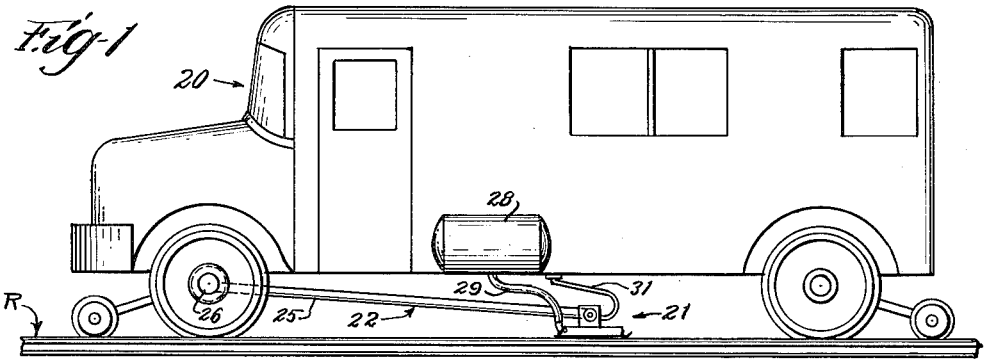
FIG. 1 is a side elevational view of a typical ultrasonic rail detector car continuously progressing an ultrasonic coupling apparatus along a section of track that is being inspected.

Referring now to the drawings and particularly to FIG. 1, there is shown a typical ultrasonic rail detector car 20 continuously progressing along a track rail R and dragging an ultrasonic coupling arrangement 21 over the rail to continuously and progressively test successive lengthwise portions of the rail. The car includes a suspension carriage arrangement 22 which may be of the same general form as that shown in copending patent application Serial No. 539,129, filed October 7, 1955, the disclosure of which is hereby incorporated by reference. According to the aforementioned application, the suspension system includes a pair of rearwardly diverging coplanar members 25 pivotally supported from a forwardly located member, which may be the axle 26 of the car, with the opposite ends of the diverging members being connected to separate ones of a pair of spring loaded bars that form a telescoping bar arrangement that extend transversely of the rails and carries ultrasonic search units at its opposite ends in working relationship with the rails. Wherever a telescoping bar appears in the present disclosure, it is designated 27. It will be apparent that other carriage arrangements for the search unit may also be employed without departing from the present invention.

The car is also shown as being provided with a coupling liquid reservoir 28 having a supply line 29 feeding the coupling apparatus. While not shown in FIG. 1, certain embodiments of the invention contemplate a return line for reclaiming liquid and returning it to the reservoir. The details of a preferred liquid-reclaiming and cleaning system for the water are better shown in FIGS. 13 thru 16, which will be described in detail hereafter. It will also be apparent that in its broader aspects, the invention is not limited to use with reclaiming systems.

According to one of the concepts of the invention, it is proposed to utilize a continuously flowing stream of coupling liquid between the facing surfaces of the rail and the ultrasonic elastic wave emitter that is carried in the coupling apparatus. The coupling liquid is caused to flow transversely of the direction in which the facing surfaces of the rail and the emitter are spaced apart, and it forms a solid stream that fills the space between these surfaces and sweeps both surfaces simultaneously. A transverse flow of coupling liquid avoids the introduction of Doppler effects into the system and, hence, avoids phase relation difficulties in the ultrasonic detecting gear.

Another advantage of a transverse flow stream resides in the fact that the flow pattern is smoother, thereby minimizing turbulence. Turbulence in the stream causes dispersion of the ultrasonic waves and leads to the development of "hash" in the reflected signals and thus contributes to the difficulties in reliably isolating the reflections characteristic of internal defects in the rail. It should be apparent that a flow stream that impinges directly against either the rail surface or emitter surface and which, hence, rebounds and collides with succeeding portions of the coupling liquid stream before finally being forced laterally out of the flow path, is more subject to the turbulence problem than a stream which is flowing transversely across these facing surfaces.

Another advantage of the arrangement resides in the fact that both of the facing surfaces are continuously swept by the present transverse flow stream and while, due to positioning relationships, there is normally a stronger tendency for bubbles to collect on the face of the ultrasonic emitter than on the rail surface, it nevertheless is important to maintain the rail surface as clean and clear as possible. In the case of rusty or rough and ragged rail, the tendency for gas bubbles to cling to the rail surface is more pronounced.

While any form of transverse flow stream offers the advantages described above, additional benefits are derived, according to the present invention, by directing the transverse flow stream oppositely to the direction in which the emitter moves along the rail. By directing the stream rearwardly, it becomes possible to substantially cancel out the forward compartment of movement which the stream is given by virtue of being carried on a moving car with the result that relative movement between the stream and the rail is minimized. Of course, some slight movement is desirable to develop the sweeping action mentioned above, but if such movement is held to a low rate, on the order of one (1) or two (2) miles per hour, there will be little tendency for the rail surface to cause turbulence in the flow stream. On rusty or ragged rail surfaces where the turbulence problems caused by the rail are most severe, the use of a rearwardly-directed transverse flow is of greatest importance. It will be recognized that, to the extent that relative movement between the flow stream and the rail surface is reduced by directing the stream oppositely of the direction of the car movement, relative movement between the face of the emitter and the flow stream is increased. The emitter face, however, is very smooth and, when mounted flush in an appropriate holder, effectively presents a streamlined surface pattern that has little or no tendency to develop turbulence.

Figure 2:
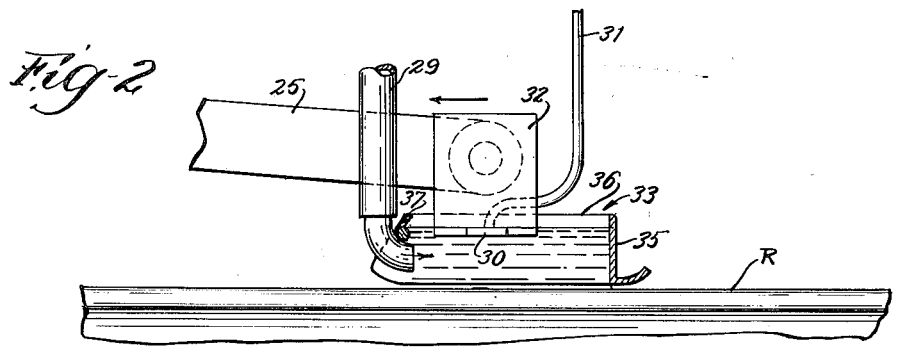
FIG. 2 is a side sectional view through a simplified form of ultrasonic coupling apparatus in accordance with the present invention.

The ultrasonic coupling apparatus illustrated generally at 21 in FIG. 1 is shown in more detail in the sectional view of FIG. 2 and is arranged to develop a rearwardly-directed flow stream that moves transversely through the space defined between the facing surfaces of the rail R and the emitter 30. In the arrangement of FIG. 2, the emitter 30 is shown as a piezoelectric crystal that is actuated by high-frequency electrical signals supplied through a coaxial cable 31. The crystal 30 is mounted in flush relation in a suitable holder 32, of Bakelite or other appropriate material, and the holder 32 is shown rigidly connected with a vertically extending open-ended framework of steel or the like that is designated generally as 33.

If desired, the crystal holder may be mounted for movement relative to the framework to compensate for changes in rail contour. As shown, the crystal 30 functions as both the sender and receiver of the ultrasonic waves; but obviously, separate crystals may be employed mounted either in the same or in separate frameworks.

The framework 33 acts as a rail shoe and rides along the top surface of the rail to support the crystal in spaced relation and is provided at its forward end with a rearwardly-directed coupling liquid supply pipe 29 that delivers a stream of water flowing transversely through the space between the facing surfaces of the crystal and the rail.

The lower edges of the open-bottomed framework engage the surface of the rail and resist leakage of water around the lower periphery of the shoe. The rear wall 35 of the shoe is shorter than the side walls 36 or the front wall 37 so that the rear wall, in effect, functions as a gate over which the coupling liquid is induced to flow to establish the desired rearwardly-directed flow stream. The wall 35 extends above the face of the crystal to maintain the flow stream in coupling contact with the crystal.

In the case of the FIG. 2 arrangement, no provisions are made for reclaiming the coupling liquid, but the coupling liquid may be water, and the invention envisions instances where the water-storage and supply facilities may be sufficient to permit water to be used freely without reclaiming and reusing it. In this connection, it should be noted that the rear wall 35 could be omitted entirely, though a significantly greater flow rate would be required to maintain the required coupling between the emitter and the rail.

Figure 3:
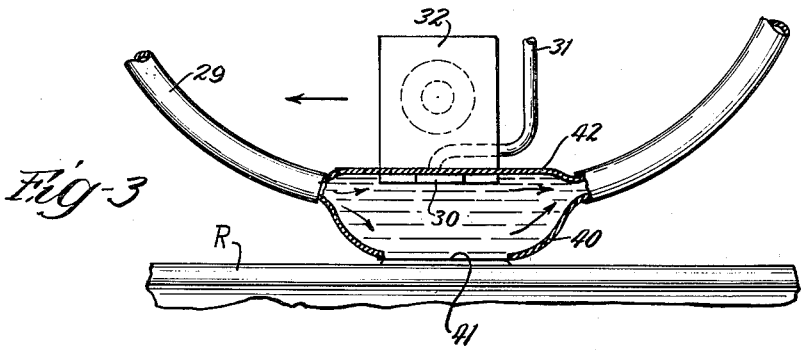
FIG. 3 is a side sectional view of an alternative form of ultrasonic coupling apparatus.

In FIG. 3 is shown a somewhat different arrangement employing a bowl-shaped rail shoe 40 having a bottom opening 41 and a closed top wall 42. The front end of the shoe 40 is provided with a rearwardly-directed coupling liquid supply line 29, and the rear end is provided with a return line 43. In effect, the FIG. 3 arrangement constitutes a substantially closed liquid supply-and-return circuit, and it is contemplated that the return line 43 may include a liquid pump to assist in returning the liquid to its storage reservoir in the detector car. There will, of course, be some leakage of water between the lower periphery of the shoe 40 and the surface of the rail, but the coupling liquid storage capacity requirements in the FIG. 3 arrangement are significantly less than in the case of the FIG. 2 arrangement. The coupling liquid supply line 29 is shown opening into the shoe chamber at a slight angle to the horizontal to illustrate that the transverse flow pattern of the invention does not unalterably require that the supply pipe itself be directed precisely normal to the direction in which the facing surfaces of the crystal and the rail are spaced apart.

In certain spots, such as on curves, the rail to be tested may be headworn and rolled at the edges in a very rough and ragged manner so that it is impossible to depend solely upon a rigid-walled shoe such as is shown in FIG. 3 for containing the coupling liquid and permitting reclaiming of the coupling liquid. In the ultrasonic coupling apparatus of FIGS. 4 and 5, which is, in effect, an extended version of the rail shoe embodiment of FIG. 2, the rail shoe consists of an inner set of liquid confining walls 50 that cooperates with the rail surface to define a liquid chamber 51 and an outer set of liquid confining walls 52 that forms a hood which cooperates with the rail surface to surround the chamber 51 defined by the inner set of liquid confining walls 50. The outer walls 52 are spaced from the inner walls 50 to form a liquid-collecting chamber 53. The forward end of the shoe again receives a rearwardly-directed inlet supply line 29 for delivering coupling liquid to the liquid-confining chamber 51. The collecting chamber 53 is connected at its rear end to a suction line 55 that is connected to a suitable suction device (not shown) for reclaiming and returning the coupling liquid.

With the arrangement shown in FIGS. 4 and 5, the steady escape of the coupling liquid from the confining chamber 51 produces the desired flow, and the suction pipe is disposed at the rear of the confining chamber to favor leakage from the rearmost end of the confining chamber and develop the desired rearward flow. This flow is increased by providing a suitable opening, such as indicated at 56, in the rear wall of the inner shoe or at any other suitable rearward point.

One of the important advantages of the arrangements of FIGS. 4 and 5 is that substantially all of the coupling liquid is reclaimed. The suction line 55 continuously draws air between the lower edges of the outer walls 52 and the rail surface, and this continuous inward flow of air sweeps liquid that has escaped from the confining chamber away from possible escape paths between the bottom edges of the walls 52 and the rail. While this action is maintained, the suction line draws up the liquid that collects in the hood 53. A complete reclaiming system for use with such an arrangement is illustrated in FIG. 13 is described hereafter.

Still another embodiment of the transverse flow principle of the present invention is shown in FIG. 6, wherein two separate liquid supply circuits are employed. The first circuit consists of a completely enclosed bowl-shaped diaphragm 60, of rubber or other suitable flexible material capable of conforming to variations in the rail contour and of good elastic wave transmitting characteristics. The thickness of the diaphragm is chosen to be on the order of one-half the wavelength of the signals passing through the diaphragm. The diaphragm 60 houses the crystal 30 and is connected to an inlet line 29 and a return line 43 which may be essentially the same as the correspondingly numbered elements in FIG. 3. A second liquid supply line $29^1$ is in front of the diaphragm member 60 and discharge a jet of coupling liquid, preferably water, to maintain a film of liquid between the bottom wall 61 of the diaphragm and the surface of the rail. With this arrangement, there is no loss of coupling liquid from the first liquid circuit, and any desired coupling liquid may be used in this circuit.

In the coupling apparatus of FIG. 6, the holder 32 is carried by a special elongated bracket 62 that secures the parts in fixed relation. Attention is directed to the fact that the supply line 29 is inclined at an angle on the order of 15 degrees to the horizontal in order to give the incoming liquid a slight downward component of movement and continuously urge the flexible bottom wall 61 into engagement with the rail surface to better enable it to conform to changes in surface contour or abrupt irregularities in the rail surface.

The foregoing arrangements have utilized a continuous transverse flow of coupling liquid to eliminate gas bubble problems, but FIG. 7 shows an arrangement based upon a somewhat different approach wherein a quantity of liquid is permanently confined within a chamber for movement along the rail in the form of a static column. The confining chamber is designated 70 and is defined by the flexible walls 71 which form a boot that houses the crystal 30 within the chamber 70 in contact with the coupling liquid. The flexible wall 71 may again be of rubber or similar material.

The boot may ride along the rail in substantially flush contact with the rail surface, as illustrated in FIG. 6, or it may float in a liquid pool or bath 72 that is formed within a suitable rail shoe 73. The shoe 73 is generally similar to the shoe 33 of FIG. 2 and it includes a rearwardly-directed inlet supply line 29 and a shortened rear wall 75 to induce a transverse flow of coupling liquid between the boot 71 and the rail surface. The crystal holder 32 carries a bracket 62 which supports front and rear pairs of vertical arms 76 that hold the shoe and boot in substantially fixed relation.

It has been found that in many locations in this country, the rail temperature may run as high as 185° F. during the hot summer months and when coupling apparatus of the type that progresses a confined liquid column along the rail is employed in continuous progressive testing operations, the couplant will reach a temperature on the order of 150° F. or more. With the couplants heretofore employed, such as water or alcohol, there is a pronounced tendency for the couplant to release gas bubbles which interfere with the testing operation. The gas bubble problem is further aggravated by turbulence effects developed as a result of the boot's travel along the rail. Double-distilled water has been utilized as the couplant in attempts to eliminate this gas bubble problem, but has not proved to be successful. According to the present invention, it is proposed to employ ethylene glycol as the couplant, or other types of liquid that are characterized by the fact that they have substantially no tendency to release gas bubbles at the operating temperatures referred to above. Accordingly, the chamber 70 in FIG. 7 is filled with ethylene glycol, which may or may not be under pressure within the chamber.

It is to be noted that in the FIG. 7 arrangement, there is the additional advantage that the boot rides in a pool of water so that the boot temperature is held significantly lower than in the instance where the boot rides directly on the rail. Furthermore, when riding in the pool of water, the development of turbulence is substantially reduced.

While the foregoing embodiments have illustrated the invention applied to coupling the ultrasonic signals through the top surface of the rail, it will be apparent that the principles are also applicable to coupling the ultrasonic signals through the side surface of the rail, and an arrangement of this type is shown in FIGS. 8 and 9, wherein an elongated rail shoe 80 is supported by the carriage members 25 and 27 in engagement with the side edge of the rail. The shoe comprises a set of inner walls 81 which extend lengthwise along the side of the rail at the lower region of the rail head and which extend vertically at the opposite ends of the shoe to define an open-topped liquid confining chamber 82. An inlet pipe 29 is disposed at the forward end of the shoe 80 to direct the coupling liquid rearwardly along the shoe and set up a transverse flow of coupling liquid between the crystals 30 and the side surface of the rail.

It will be noted that separate sending and receiving crystals are shown in order to detect transverse defects, and they are located sufficiently beneath the top surface of the rail so that the transmission of the ultrasound will not be blocked by shelly or burns, and their location is ideally suited to the detection of detail fractures. The shoe, as shown, also includes an outer set of walls 83 spaced from the walls 81 to form a liquid collecting chamber 84 that is connected to a suction line 85 for reclaiming liquid that escapes between the adjacent portions of the inner walls 81 and the rail. The suction line 85 sets up an in-flow of air between the adjacent portions of the outer walls and the rail which continuously sweeps the water into the chamber 84 in a manner analogous to the action described in connection with FIG. 4. The suction line 85 is again shown at the rear end of the shoe to assist in developing the desired rearward flow of coupling liquid. The shoe 80 in FIGS. 8 and 9 has a length on the order of two feet and while the detector car is traversing curves, certain portions of the shoe momentarily will become spaced from the rail but, assuming a three-degree curve, such spacing would only amount to $\frac{1}{10}$ of an inch at the most and will not in any way impair the ability of the suction line to reclaim the coupling liquid. In fact, the presence of slight clearances enhances the sweeping action due to increased flow of the incoming air.

It should be understood that the description of the preferred form of the invention is for the purpose of complying with Section 112, Title 35, of the United States Code, and that the appended claims should be construed as broadly as the prior art will permit.

I claim:

1. In ultrasonic flaw testing, the method of coupling ultrasonic energy between the momentarily facing surfaces of a track rail and an elastic wave emitting element carried by a detector car that progresses continuously along said rail comprising maintaining said surfaces in spaced relationship with an unrestricted space extending therebetween, and forming and flowing a solid stream of coupling liquid substantially undirectionally across said space in a direction opposite to the direction of movement of said car to fill said space and sweep both of said surfaces.

2. The method as recited in claim 1, wherein the rate of flow of said stream is substantially equal to the speed of the car.

3. In an ultrasonic flaw testing arrangement wherein a detector car carries ultrasonic equipment that includes an elastic wave emitting element for continuously progressing said element along longitudinally successive portions of a track rail: coupling apparatus for transmitting elastic vibrations between the momentarily facing surfaces of said element and said rail and comprising carriage means carried by said car and supporting said element to hold said facing surfaces in spaced relation with an unrestricted region extending therebetween; liquid confining wall means supported from said carriage means in juxtaposed relation with surface portions of said rail and cooperable with said surface portions to form a liquid confining chamber around the bottom and sides of said region; and means for forming and continuously flowing a solid stream of coupling liquid substantially unidirectionally across said region in a flow direction generally parallel to the plane of said successive rail surface portions and including a liquid outlet communicating with said region on one side thereof, a liquid inlet line opening into said region through said confining wall at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

4. In an ultrasonic flaw testing arrangement wherein a detector car carries ultrasonic equipment that includes an elastic wave emitting element for continuously progressing said element along longitudinally successive portions of a track rail: coupling apparatus for transmitting elastic vibrations between the momentarily facing surfaces of said element and said rail and comprising carriage means carried by said car and supporting said element to hold said facing surfaces in spaced relation with an unrestricted region extending therebetween; liquid confining wall means supported from said carriage means to contact and surround the outer margin of said facing surface of said rail such that said wall means and said facing surface of said rail define a liquid confining chamber that completely surrounds said region and houses the facing surface of said element; and a coupling liquid supply-and-return circuit means for forming and continuously flowing a solid stream of coupling liquid substantially unidirectionally across said region in a flow direction generally parallel to the plane of said successive rail surface portions and including a liquid outlet communicating with said region on one side thereof, a liquid inlet line opening into said region through said confining wall at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

5. In a detector car of the type adapted to ride along track rails and having ultrasonic equipment thereon that includes an element for emitting vibrational signals, said car continuously progressing said element along longitudinally successive substantially coplanar surface portions of one of the rails to successively establish said element in working relationship therewith, means including hollow structure carried by the car and supporting said element in spaced apart relation to said one rail, with said structure having a wall engageable with the rail and surrounding the region extending between adjacent surfaces of said element and said one rail, and means for forming and continuously flowing a solid stream of coupling liquid substantially unidirectionally across said region in a flow direction generally parallel to the plane of said successive rail surface portions and including a liquid outlet communicating with said region on one side thereof, a liquid inlet line opening into said region through said surrounding wall at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

6. In a detector car of the type adapted to ride along track rails and having ultrasonic equipment thereon that includes an electromechanical crystal transducer for emitting vibrational signals, said car continuously progressing said transducer along longitudinally successive substantially coplanar surface portions of one of the rails to successively establish said transducer in working relationship therewith, means including hollow wall structure carried by the car and supporting said transducer in spaced apart relation to said one rail, with the distance between said transducer and said one rail being a number of times greater than the thickness of said crystal transducer and with said structure having a wall engageable with the rail and surrounding the region extending between adjacent surfaces of said transducer and said one rail, and means for forming and continuously flowing a solid stream of coupling liquid substantially unidirectionally across said region in a flow direction generally parallel to the plane of said successive rail surface portions and including a liquid outlet communicating with said region on one side thereof, a liquid inlet line opening into said region through said surrounding wall at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

7. In ultrasonic flaw testing equipment, coupling apparatus for transmitting vibrational signals between a vibrational signal emitter and an object under test and comprising hollow supporting structure housing said emitter in spaced apart relation to said object, with said structure having a wall engageable with the object and surrounding the region extending between adjacent surfaces of said emitter and object, and means for forming and flowing a solid stream of coupling liquid substantially unidirectionally across said region in a flow direction generally parallel to said object surface and including a liquid outlet communicating with said region on one side thereof, a liquid inlet line opening into said region through said surrounding wall at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

8. In a detector car of the type adapted to ride along track rails and having ultrasonic equipment thereon that includes an element for emitting vibrational signals, said car continuously progressing said element along longitudinally successive substantially coplanar surface portions of one of the rails to successively establish said element in working relationship therewith, means including hollow structure carried by the car and supporting said element in spaced apart relation to said one rail, with said structure having a wall engageable with the rail and surrounding the region extending between adjacent surfaces of said element and said one rail, and means for forming and continuously flowing a solid stream of coupling liquid substantially unidirectionally across said region in a flow direction generally parallel to the plane of said successive rail surface portions, said flow directions extending opposite to the direction of movement of said car along said rails such that relative movement between said stream and said car is substantially reduced, said last-named means including a liquid outlet communicating with said region at the rearward side thereof, a liquid inlet line opening into said region through said surrounding wall at a forward location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

9. In ultrasonic flaw testing equipment, coupling apparatus for transmitting vibrational signals between a vibrational signal emitter and an object under test and comprising means for moving said emitter with respect to said object to progressively bring said emitter into working relationship with successive surface portions of said object and including hollow structure supporting said element in spaced apart relation to said object, with said structure having a wall engageable with the object and surrounding the region extending between adjacent surfaces of said element and said object, and means for forming and continuously flowing a solid stream of coupling liquid substantially unidirectionally across said region in a flow direction generally parallel to the plane of the adjacent surface portion of the object, said flow direction extending opposite to the direction of relative movement between said emitter and said object such that relative movement between said stream and said object is substantially reduced, said last-named means including a liquid outlet communicating with said region at the rearward side thereof, a liquid inlet line opening into said region through said surrounding wall at a forward location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein, to sweep both said adjacent surfaces in flowing towards said outlet.

10. In a detector car of the type adapted to ride along track rails and having ultrasonic equipment thereon that includes an element for emitting vibrational signals, said car continuously progressing said element along longitudinally successive substantially coplanar surface portions of one rail to successively establish said element in working relationship therewith, means for coupling vibrational signals between said element and said rail and including hollow structure carried by the car and supporting said element in spaced apart relation to said rail, said structure having liquid confining wall means extending adjacent the rail and substantially enclosing a region between adjacent surfaces of said element and said rail, and means for forming and continuously flowing a solid stream of coupling liquid substantially unidirectionally across said region in a flow direction generally parallel to the plane of said successive rail surface portions and including a liquid outlet communicating with said region on one side thereof, a liquid inlet line opening into said region through said confining wall means at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein for sweeping boundary surfaces of said region in flowing towards said outlet.

11. In an ultrasonic flaw testing arrangement wherein a detector car carries ultrasonic equipment that includes an elastic wave emitting element for continuously progressing said element along longitudinally successive portions of a track rail: coupling apparatus for transmitting elastic vibrations between the momentarily facing surfaces of said element and said rail and comprising carriage means carried by said car and supporting said element to hold said facing surfaces in spaced relation with an unrestricted region extending therebetween; liquid confining wall means supported from said carriage means in juxtaposed relation with surface portions of said rail to form a liquid confining chamber around the bottom and sides of said region; means for forming and continuously flowing a solid stream of coupling liquid substantially unidirectionally across said region in a flow direction generally parallel to the plane of said successive rail surface portions and including a liquid outlet communicating with said region on one side thereof, a liquid inlet line opening into said region through said confining wall at a location spaced across said region from said outlet and generally opposite to said outlet, said inlet line approaching and entering said region along a direction corresponding generally to said flow direction, means for supplying coupling liquid through said inlet line to form a solid continuous stream of coupling liquid filling said region and flowing through said region substantially unidirectionally and free from turbulence therein, to sweep both said adjacent surfaces in flowing towards said outlet; additional wall means supported from said carriage means in juxtaposed relation with surface portions of said rail to form a hood that completely surrounds the confining chamber; and suction means communicating with said hood for reclaiming the coupling liquid that escapes from said chamber.

12. In an ultrasonic flaw testing arrangement wherein a detector car carries ultrasonic equipment that includes an elastic wave emitting element for continuously progressing said element along longitudinally successive portions of a track rail: coupling apparatus for transmitting elastic vibrations between the momentarily facing surfaces of said element and said rail and comprising carriage means carried by said car and supporting said element to hold said facing surfaces in spaced relation; liquid confining wall means supported from said carriage means to define a liquid confining chamber that houses the said facing surface of said element and includes a wall of elastic wave transmitting material extending adjacent the said facing surface of said rail for coupling relationship therewith, means for forming and continuously flowing a solid stream of coupling liquid substantially unidirectionally across said chamber in a flow direction generally parallel to the plane of said successive rail surface portions and including a liquid outlet communicating with said chamber on one side thereof, a liquid inlet line opening into said chamber through said confining wall means at a location spaced across said chamber from said outlet and generally opposite to said outlet, said inlet line approaching and entering said chamber along a direction corresponding generally to said flow direction, and means for supplying coupling liquid through said inlet line to form a solid continuous stream of coupling liquid filling said chamber and flowing through said chamber substantially unidirectionally and free from turbulence therein, to sweep both said facing surface of said element and the inside surface of said wall of elastic wave transmitting material in flowing towards said outlet.

13. In an ultrasonic flaw testing arrangement wherein a detector car carries ultrasonic equipment that includes an elastic wave emitting element for continuously progressing said element along longitudinally successive portions of a track rail, coupling apparatus for transmitting elastic vibrations between the momentarily facing surfaces of said element and said rail and comprising carriage means carried by said car and supporting said element to hold said facing surfaces in spaced relation; liquid confining wall means supported from said carriage means to define a liquid confining chamber that houses the facing surface of said element and includes a wall of elastic wave transmitting material spaced intermediate said facing surfaces, coupling liquid stored in and filling said chamber, said coupling liquid being non-gassing at 150° F. and below; liquid confining wall means supported from said carriage means to contact and cooperate with surface portions of said rail and form a liquid confining region around the bottom and the sides of the space between said elastic wave transmitting wall and the facing surface of said rail; means for forming and continuously flowing of solid stream of coupling liquid substantially unidirectionally across said region in a flow direction generally parallel to the plane of said successive rail surface portions and including a liquid outlet communicating with said region on one side thereof, a liquid inlet line opening into said region through said confining wall means at a location spaced across said region from said outlet and generally opposite to said outlet, said inlet line approaching and entering said region along a direction corresponding generally to said flow direction, and means for supplying coupling liquid through said inlet line to form a solid continuous stream of coupling liquid filling said region and flowing through said region substantially unidirectionally and free from turbulence therein to sweep the outside surface of said wall and the facing surface of said rail.

References Cited in the file of this patent

UNITED STATES PATENTS

| | | |
|---|---|---|
| 2,283,285 | Pohlman | May 19, 1942 |
| 2,592,134 | Firestone | Apr. 8, 1952 |
| 2,678,559 | Drake | May 18, 1954 |
| 2,873,391 | Schulze | Feb. 10, 1959 |

FOREIGN PATENTS

| | | |
|---|---|---|
| 893,459 | France | Jan. 31, 1944 |
| 548,960 | Great Britain | Oct. 30, 1942 |

OTHER REFERENCES

Sheet Fractures Detected with Supersonic, publication in the Iron Age; June 8, 1944.

Publication: Rudiger, "Process in—Testing," Engineers Digest, vol. 11, No. 10; October 1950, pp. 352–354.